July 21, 1959
J. J. MANNING
2,895,377
ENLARGING EASEL ESPECIALLY ADAPTED FOR USE
IN A SYSTEM FOR IDENTIFYING HORSES
Filed April 6, 1956
2 Sheets-Sheet 1
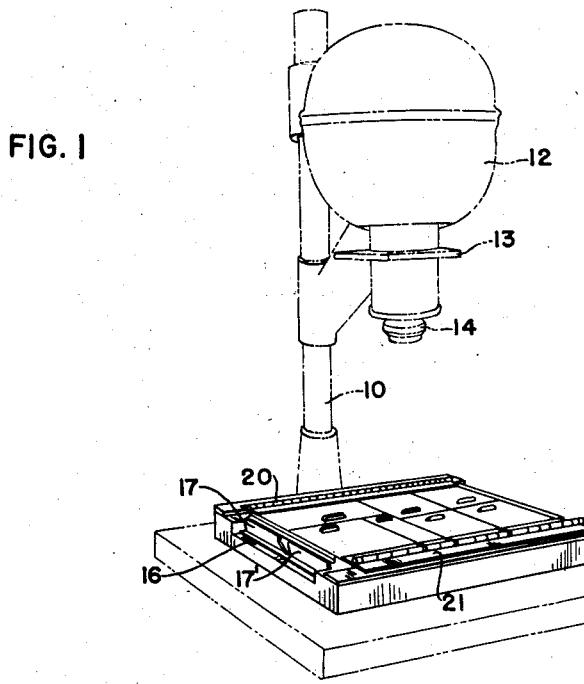
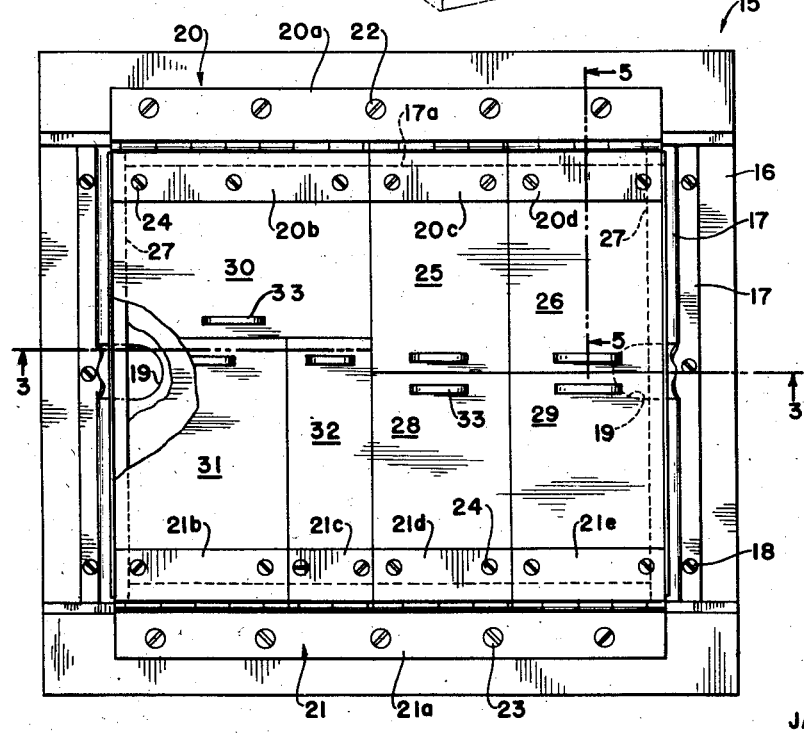
INVENTOR
JAMES J. MANNING
BY
ATTORNEYS July 21, 1959 J. J. MANNING 2,895,377
ENLARGING EASEL ESPECIALLY ADAPTED FOR USE
IN A SYSTEM FOR IDENTIFYING HORSES
Filed April 6, 1956 2 Sheets-Sheet 2

INVENTOR
JAMES J. MANNING
BY
ATTORNEYS

United States Patent Office 2,895,377
Patented July 21, 1959

2,895,377

ENLARGING EASEL ESPECIALLY ADAPTED FOR USE IN A SYSTEM FOR IDENTIFYING HORSES

James J. Manning, Floral Park, N.Y.

Application April 6, 1956, Serial No. 576,692

5 Claims. (Cl. 88—24)

The present invention relates to apparatus for use in an improved system for the identification of horses, and more particularly to a novel photographic enlarger easel having improved features specially adapting the easel for use in connection with the identification system.

In the past, considerable difficulties have been encountered in connection with the identification of horses. Accurate and positive identification of horses is of great importance in pari-mutuel horse racing, for example, to prevent the making of false race entries to take advantage of favorable betting odds. Likewise, proper identification is important in breeding, to guarantee the identity of the sire and dam of a foal, and to insure against theft and substitution of valuable thoroughbred horses. Experimental tests have shown that various horses may be positively identified by means of small growths or "chestnuts" found on the inside of a horse's legs, near its knees. After a year's growth the chestnuts remain unchanged in their distinctive size and shape during the horse's lifetime, and it has been found that the chestnuts of each horse are as distinctive to that horse as are fingerprints to a human person.

While the distinctiveness of a horse's chestnuts has been known for some time, there has been no practical system or apparatus by means of which such knowledge could be applied effectively to large-scale activities, such as pari-mutuel racing. The present inventor has developed a useful and practical system for effectively utilizing the characteristics of the chestnuts of a horse, along with other distinctive features of the horse, to provide means for positively identifying any one of a large number of horses in a short time. Briefly, the sustem is as follows: First, the chestnuts on each leg of the horse are photographed by means of a special apparatus, described and claimed in my co-pending application, Serial No. 576,666, filed April 6, 1956, now Patent No. 2,866,395, for Camera Apparatus Especially Adapted For The Photographic Identification of Horses. The photograph thus taken shows a close-up view of the individual chestnuts, substantially exactly one-third of the original size. With the same special camera apparatus, a photograph is taken of an identification card especially prepared for the horse in question and listing such data as the horse's name, color, sex, distinguishing body marks and the important features of the horse's chestnuts, indicating both the size and the distinctive shape thereof. The horse is also photographed from the front and in profile. From the various photographs thus taken, a large composite photograph is prepared in which the four chestnuts are grouped in a known order at one side of the photograph, and the front and profile views of the horse, as well as the photograph of the card, are grouped at the other side of the composite. The chestnut photographs, and that of the card, originally taken at exactly one-third original size, are enlarged exactly three times in the composite. The chestnuts then appear in actual size, and the accuracy of their representation may be checked by reference to marks of known dimension on the identification card.

Thus, since the identification card has been photographed and enlarged with the same equipment and in the same manner as the chestnuts, the enlarged view of the marks of known dimension will bear the same relation to the actual dimensions of the marks as the enlarged photographs of the chestnuts will bear to the actual chestnuts of the horse. The accuracy of the representation of the horse's chestnuts may therefore be quickly checked by merely measuring the marks of known dimension on the identification card as it appears in the composite photograph.

The composite photograph as thus described forms a complete identification record for the horse in question, which may be reproduced if necessary and placed on file at various race tracks, for example, so that the horse may be readily identified at the track when entered for racing there. The actual-size chestnut photographs are also very useful in properly identifying and classifying the distinctive characteristics of the chestnuts, since one of these distinctive characteristics is size. Thus, from the actual-size photograph, the area of each chestnut may be measured with an ordinary planimeter, and in my improved system the size of a chestnut as thus measured is recorded on the identification card and forms an important part of the identification record.

In order to establish a practical working identification system for large-scale activities, such as parimutuel racing, rapid and efficient processing of the photographic records is imperative. Thus, the present invention is directed to an improved easel apparatus for use in preparing an enlarged composite photographic identification record from the various individual photographs taken of the horse and identification card.

More specifically, the invention provides a novel enlarging easel especially adapted for use in my improved identification system which includes means for receiving and supporting a large plate of photo-sensitive paper, such as an 8" x 10" sheet, and means for selectively and independently exposing designated limited areas of the sheet in turn. The arrangement is such that each of the various photographs (actually negatives) may be exposed on the composite sheet at a particular location and covering a predetermined area, thereby insuring that all of a large number of composite photographs so produced will be uniform throughout. The invention further provides a novel enlarging easel assembly which facilitates the reproduction, on a single composite photograph, of separate photographs of the chestnuts of a horse, located in convenient relation to a photograph of an identification card for the horse, bearing a mark of known dimensions, to facilitate cross-checking of the accuracy of the chestnut photographs at any time.

In the new easel, a sheet of photo-sensitive paper is normally covered and protected from the light by a plurality of masking elements which may be independently removed from covering position. Together, the plurality of masking elements cover the entire surface of the easel and totally mask a sheet of photographic paper held therein. Each of the masking elements is of a predetermined size and has a selected location on the easel, so that the elements may be individually opened to permit a single photograph to be made upon a preselected area of the paper.

Each of the separate masking elements in the new easel has a white or light-colored upper surface, so that when the masking elements are closed the enlarger may be turned on to project an image upon the upper surface of the easel. The white upper surface of the masking elements makes the image readily visible to the operator, and he may easily shift the easel to a position in which the image is projected directly upon the individual masking element covering the area next to be exposed. When the easel is thus properly positioned, the masking element is opened and the enlarger is again turned on to cast the image on the thus uncovered portion of the large photographic sheet.

For a better understanding of the invention, reference should be made to the following detailed description and accompanying drawings in which:

Fig. 1 is a perspective view of the new easel showing the manner in which the easel is used with conventional enlarging apparatus;

Fig. 2 is a top plan view of the new easel, with parts broken away;

Figure 3:
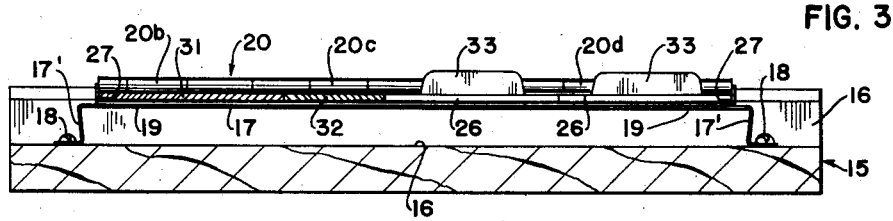
Fig. 3 is a cross-sectional view taken generally along the line 3—3 of Fig. 2.

The reference numeral 10 designates generally a conventional photographic enlarger including a base 11, light source 12, film support 13, and projecting lens 14. An enlargement is made by placing a negative (not shown) in the film support 13 and energizing the light source 12 to project the negative image through the lens 14 and toward the base 11. A sheet of photo-sensitive paper is supported in the path of the projected image and is exposed by the light beam. It is conventional to support the sheet of photographic paper upon a suitable easel which normally covers the paper and protects it from exposure while the easel is being properly positioned with respect to the enlarger.

The new enlarger easel comprises a base plate 15 having dimensions somewhat greater than those of the photographic sheet and is adapted to accommodate, and having a channel 16 formed in its upper surface and extending longitudinally of the base plate 15. A paper-supporting platform 17, formed of sheet metal, and having downwardly extending leg portions 17' is secured in the channel 16 by means of a plurality of screws 18. As illustrated in Fig. 3, the upper surface of the support or platform 17 is spaced slightly below the upper surface of the base plate 15. At one or both ends, the support 17 has a recess 19 which facilitates gripping of a sheet of photosensitive paper lying on the support. At its side edges, the support 17 has inturned lips 17a projecting inwardly a short distance over the top surface of the support in spaced relation thereto. The lips 17a are adapted to engage and confine the side edges of a sheet of photosensitive paper (not shown) inserted in the easel.

Along the opposite sides of the base plate 15 are hinges 20, 21, which are most advantageously formed with elongated unitary outer portions and a plurality of separately movable inner portions. Thus, the hinge 20 comprises a single outer part 20a, secured to the base plate 15 by a plurality of screws 22, and three separately movable inner parts 20b, 20c, 20d which normally extend a short distance over the top surface of the support 17. Likewise, the hinge 21 comprises an elongated outer part 21a, secured to the base plate 15 by screws 23, and four separately movable inner parts 21b, 21c, 21d, 21e. Both of the hinge assemblies 20, 21 are substantially equal in length and are symmetrically positioned on the base plate 15 of the easel.

Each of the separately movable parts of the hinges 20, 21 has a separate masking element secured thereto by suitable screws or rivets 24, for example. In accordance with the invention, each of the separate masking elements covers a particular portion of the support 17, and together, the plurality of masking elements completely cover the entire surface of the support. Referring particularly to Fig. 2, the inner hinge parts 20c, 20d, at the right-hand side of the easel, support a pair of masking elements 25, 26 in side-by-side relation. The elements 25, 26 are of equal length and extend to the center of the easel. As will be observed, the masking element 26 is of slightly greater width than the element 25. However, it is intended that the elements 25, 26 will cover areas of the photographic papers of substantially the same size. The masking element 26, at the end of the easel, is slightly wider than the element 25 because a portion of the element 26 overlies one of the lips 27 provided at each end of the paper support 17 for confining the end edges of the paper. In the illustrated and preferred form of the invention, the combined width of the masking elements 25, 26 is such that together they cover an area extending slightly over half the length of the paper support 17.

At the right-hand end of the hinge 21 are separately movable masking elements 28, 29 supported by the hinge parts 21d, 21e, respectively. The masking element 28 is substantially identical to and is positioned directly opposite the element 25. Likewise, the element 29 is substantially identical to and positioned directly opposite the element 26. Thus, together, the masking elements 25, 26, 28, 29 cover an area constituting somewhat more than one-half of the area of the support 17, and each element individually covers one quarter of this area.

At the left end of the easel, the hinge part 20b supports a masking element 30 covering an area of the support 17 extending from the left edge of the masking element 25 to the lip 27 at the left end of the easel. In the illustrated form of the invention, the masking element 30 terminates short of the longitudinal center line of the easel. Directly opposite the masking element 30 are masking elements 31, 32 carried by the hinge parts 21b, 21c respectively and having a combined width equal to the width of the masking element 30. The elements 31, 32 are of equal length and extend past the longitudinal center line of the easel to the free end of the masking element 30. As will be observed in Fig. 2, the element 32 is of relatively small width, while the adjacent element 31 is substantially wider. Together, the elements 31, 32 cover an area of the platform or support 17 extending longitudinally from the lip 27, at the left end of the easel, to the left edges of the masking elements 25, 28.

Figure 4:
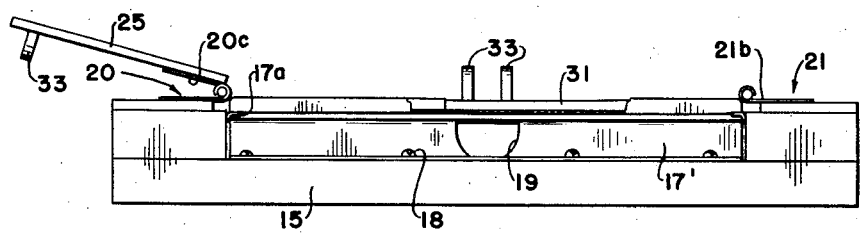
Fig. 4 is an end elevation of the new easel with parts broken away.

Each of the separate masking elements is provided with a handle or knob 33 near its free end whereby the individual elements may be manually engaged and hinged outwardly, substantially in the manner indicated in Fig. 4, to expose a designated portion of the support 17.

Figure 5:
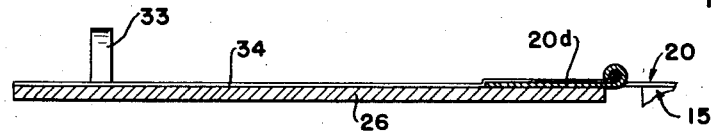
Fig. 5 is an enlarged fragmentary cross-sectional view taken generally along the line 5—5 of Fig. 2.

As shown in Fig. 5, the masking elements are provided with a surface layer or coating 34 adapted for good reflection of light. A white or other light-colored coating is desirable for this purpose. Alternately, the entire masking element may be formed of a white or other light-colored material providing the desired upper surface.

To use the new easel, a large photographic sheet is inserted at one end of the easel so that its side edges are engaged by the lips 17a of the support, while the body of the paper is held in a flat condition upon the upper surface of the support. This is done in a darkroom, or at least under dim lighting conditions, to avoid premature exposure of the paper. The easel is then placed upon the base 11 of the enlarger 10, with all of the masking elements of the easel in a closed position. A strip of film, having the desired series of exposures thereon, is inserted in the film support 13 of the enlarger, and the light source 12 is energized to cast an image upon the light-colored upper surface of the easel mask. The easel is then manipulated so that the projected image is properly centered upon the desired one of the masking elements. After the easel is thus positioned, the light source 12 is de-energized and the particular masking element upon which the image is cast is hinged back to uncover a portion of the photo-sensitive paper. At this time the light source 12 is again energized and the image is cast directly upon the photographic paper for a predetermined interval of time sufficient to expose the paper with the projected image.

After one exposure has been made, the film is shifted in the support 13 to project a new image upon the upper surface of the easel. All of the masking elements will be closed at this time. The easel is then shifted on the base 11 so that the new image is properly centered with respect to another one of the masking elements. A second exposure is then made by opening the masking element and energizing the light source 12 for a predetermined interval. This same procedure is repeated until the entire photographic sheet has been exposed, after which the sheet is developed in the usual manner, to provide the desired identification record.

Figure 6:
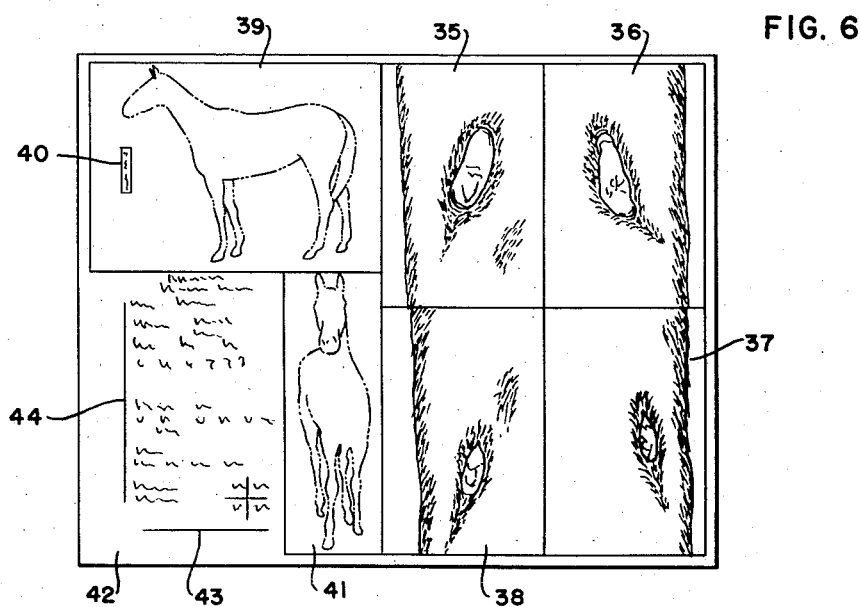
Fig. 6 is a top plan view of a composite photograph produced in the new easel and forming an identification record for use in the new horse-identification system.

The completed composite identification photograph is shown in Fig. 6. At the right-hand side of the photograph are four rectangular areas 35–38, of substantially equal size, located in the four quadrant sections of a rectangular area of the composite. The rectangular areas 25–38 respectively illustrate the chestnuts of the left front, right front, right rear, and left rear legs of the horse; and as heretofore explained, the photographic processes are such that the chestnuts appear substantially exactly in actual size, so that the area thereof may be readily determined using a conventional planimeter.

In the upper left portion of the composite photograph of Fig. 6 is an area 39 in which appears a profile view of the horse. It may be desirable, in this same view, to include a plate 40 carrying the horse's name and such other identifying matter as may be necessary or desirable. The plate 40 may be included in the photograph by holding or hanging the plate in the field of view when the original photograph is taken.

In the area comprising the lower left-hand portion of the composite photograph, below the profile view 39 and to the left of the chestnut views 35, 38, are side-by-side views 41, 42. In the area 41, which is located immediately adjacent the chestnut view 38, is a front view of the identified horse, taken at the same time as the profile view 39. Immediately to the left of the front view 41 is a photographic reproduction of an identification card for the horse, which appears in the area 42. The identification card is printed and/or typewritten and contains pertinent identifying information such as color, sex, distinguishing body marks, and characteristic features of the chestnuts of the horse, including both the size and shape thereof. The card also includes one or more reference lines 43, 44 which are of known length in the original card. The lines 43, 44 may be measured on the completed composite, and if the length of the lines 43, 44, as photographically reproduced, is substantially identical to the actual length of the lines in the original card, it may be assured that the views 35–38 of the chestnuts of the horse are substantially exact actual-size views. This follows, since identical photographic processes are utilized in the photographing and enlarging of the chestnuts and identification card.

The new easel apparatus is especially adapted for use in connection with my improved horse identification system and has many advantages for such use. The easel is provided with a mask adapted to cover the entire surface of a sheet of photographic paper and comprising a plurality of hinged masking elements, each covering only a selected portion of the sheet. The arrangement is such that selected portions of the sheet may be exposed in sequence to provide a composite photographic record containing sufficient identifying characteristics of a horse to enable the identification of a particular horse to be quickly ascertained. The design of the easel is such as to greatly facilitate the procedure of enlarging and combining the plurality of separate photographs into a composite in which the desired indicia of identification is presented clearly, uniformly, and in such manner as to enable its effective use by relatively unskilled persons. Thus, photographs of the four chestnuts of a horse are combined in the composite in such manner as to occupy four quadrant portions of a rectangular area at one side of the composite, with each of the quadrant portions being of substantially equal size. The other side of the composite contains front and profile views of the horse, together with pertinent identifying information, and lines or other objects of known standard dimension providing an internal check on the accuracy of representation of the chestnuts.

Another advantageous feature of the new easel resides in the provision of a plurality of separately removable masking elements, together comprising a complete mask for the photographic paper, and which are provided with upper surfaces capable of properly reflecting an image projected from a standard photographic enlarger. The arrangement is such that the easel may be easily manipulated with all masking elements closed until a desired image is centered on one of the masking elements. The masking element in question may then be opened to permit the exposure of the area of the photographic sheet lying beneath the masking element.

Since the specific apparatus illustrated and described herein may be altered slightly without departure from the clear teachings of the invention, reference should be made to the following appended claims in determining the full scope of the invention.

I claim:
1. An enlarging easel especially adapted for the preparation of a composite of enlargements of photographs for the identification of horses, comprising a base, a support on said base for engaging and supporting a rectangular sheet of photographic paper, a plurality of separate masking elements hinged to said base and individually movable with respect thereto, said masking elements acting in combination to cover the whole of the surface of a photographic sheet on said support, said masking elements being of rectangular shape and being at least seven in number, four of said masking elements being grouped at one end of said base and being adapted to cover four substantially equal quadrant portions of a rectangular area of said photographic sheet, said rectangular area being substantially less than the whole of the effective area of said sheet and means forming light-colored upper surfaces for said masking elements to facilitate the projection of an image thereupon for aligning said easel preparatory to exposing a portion of said photographic paper.

2. An enlarging easel especially adapted for the preparation of a composite of enlargements of photographs for the identification of horses, comprising a support for a large rectangular sheet of photographic paper, a plurality of separate masking elements individually movable with respect to said support and acting in combination to cover the whole of the surface of a sheet of photographic paper positioned on said support, and hinge means secured in fixed relation to said support and mounting said masking elements for independent hinging movement, said masking elements being of rectangular shape numbering in excess of four, at least four of said elements being grouped about a rectangular area of said support and adapted to cover substantially equal quadrant portions of said area said rectangular area being substantially less than the whole of the effective area of said sheet.

3. The enlarging easel of claim 2, further characterized by said hinge means comprising hinges mounted at opposite sides of said support, two of the masking elements of the said four thereof being carried by one of said hinges and the other two masking elements of the said four thereof being carried by the other of said hinges.

4. The enlarging easel of claim 2, further characterized by said masking elements being formed at least in part of material forming light-colored upper surfaces for said masking elements.

5. The enlarging easel of claim 2, further characterized by said masking elements numbering seven, four of said masking elements being grouped about a rectangular area at one end of said support and adapted to cover substantially equal quadrant portions of said rectangular area, another of said masking elements being adapted to cover a second area of said support extending from said rectangular area to the other end of said support and lying along one edge of said support, and the other two of said masking elements being adapted together to cover the area of said support bounded by said rectangular area and said second area, one of the said other two of said masking elements being relatively narrow in one dimension and elongate in the other.

References Cited in the file of this patent

UNITED STATES PATENTS

| | | |
|---|---|---|
| 1,036,073 | Campeau | Aug. 20, 1912 |
| 2,187,381 | Lane | Jan. 16, 1940 |
| 2,335,189 | Mayer | Nov. 23, 1943 |
| 2,412,288 | Pollak | Dec. 10, 1946 |